(12) United States Patent
Sekiguchi et al.

(10) Patent No.: US 8,310,733 B2
(45) Date of Patent: Nov. 13, 2012

(54) IMAGE READING APPARATUS

(75) Inventors: Nobuo Sekiguchi, Moriya (JP);
Shigemichi Hamano, Abiko (JP); Kenji Morita, Toride (JP); Akiko Kanno, Kashiwa (JP); Satoshi Seki, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 521 days.

(21) Appl. No.: 12/555,284

(22) Filed: Sep. 8, 2009

(65) Prior Publication Data

US 2010/0073739 A1 Mar. 25, 2010

(30) Foreign Application Priority Data

Sep. 24, 2008 (JP) ................... 2008-244944

(51) Int. Cl.
*H04N 1/04* (2006.01)
*H04N 1/46* (2006.01)
*H04N 1/60* (2006.01)
*H04N 1/40* (2006.01)
*G06F 3/12* (2006.01)
*G06K 15/00* (2006.01)
*G06K 9/00* (2006.01)
*G03G 15/08* (2006.01)
*G03G 15/00* (2006.01)

(52) U.S. Cl. ......... 358/474; 358/509; 358/1.9; 358/448; 358/1.13; 358/2.1; 358/486; 399/27; 399/367; 382/162

(58) Field of Classification Search .............. 358/474, 358/509, 1.9, 448, 1.13, 2.1, 486; 399/27; 382/162

See application file for complete search history.

(56) References Cited

U.S. PATENT DOCUMENTS

| 6,377,705 | B1 | 4/2002 | Sato et al. |
| 6,765,703 | B1 | 7/2004 | Watanabe |
| 2002/0140998 | A1 | 10/2002 | Cardot et al. |
| 2003/0007196 | A1* | 1/2003 | Ishimaru et al. ............ 358/486 |
| 2003/0053157 | A1 | 3/2003 | Sakakibara et al. |
| 2004/0174568 | A1 | 9/2004 | Murakami |

FOREIGN PATENT DOCUMENTS

| JP | 2000-165609 | 6/2000 |
| JP | 2001-144900 | 5/2001 |
| JP | 2001-217995 A | 8/2001 |
| JP | 2006-304186 | 11/2006 |
| JP | 2008-131473 A | 6/2008 |
| JP | 2003-274115 | 9/2009 |

OTHER PUBLICATIONS

European Communication and Search Report dated Jan. 14, 2010, regarding European Appl. No. 09169340.8-1522.

* cited by examiner

*Primary Examiner* — Charlotte M Baker
*Assistant Examiner* — Rury Grisham
(74) *Attorney, Agent, or Firm* — Fitzpatrick, Cella, Harper & Scinto

(57) ABSTRACT

An image reading apparatus that, in a case where the light amount of light illuminated from an image reading lamp has decreased, maintains the quality of a read image without decreasing productivity, and a method for controlling that image reading apparatus, are provided. To accomplish this, this image reading apparatus is provided with RGB line sensors that read a color image, and a monochrome line sensor that reads a monochrome image and has a faster horizontal transfer speed than the RGB line sensors. Further, this image reading apparatus reads a monochrome image using the RGB line sensors even in a monochrome mode in a case where the light amount of the lamp for illuminating an original decreases and so an output level for reading an image with good quality cannot be obtained from the monochrome line sensor.

9 Claims, 8 Drawing Sheets

IMAGE READING APPARATUS

BACKGROUND OF THE INVENTION

1. Field of the Invention

The present invention relates to an image reading apparatus provided with a device that optically reads an original, such as a scanner installed in a copier or a fax machine, or a single flat-bed scanner.

2. Description of the Related Art

In a conventional color scanner, an RGB 3-line sensor is adopted in order to read a color original. This 3-line sensor is a sensor that receives light and convert that received light to an electrical signal, such as a CCD (Charge Coupled Device) or CIS (Contact Image Sensor). Further, by applying filters of the three primary colors of light, R (Red), G (Green), and B (Blue), for example, and combining data for each pixel, which is an electrical signal for the corresponding color gamut, the electrical signals are converted to a color image.

Figure 8:
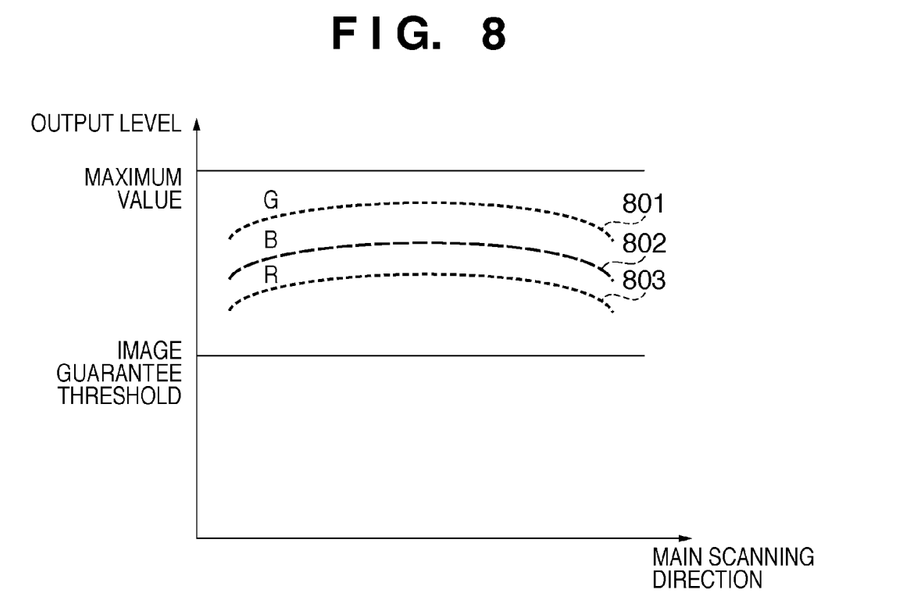
FIG. 8 shows output signals that are output from an RGB line sensor.

In an MFP (Multi Function Printer), in a color reading mode in which an image of a color original is printed in color to an output paper, or transferred to a host such as a personal computer as color image data, the original image is read using all of the sensors R, G, and B. On the other hand, there is also a monochrome reading mode in which an image of a color original is printed in monochrome to an output paper, or transferred to a fax machine or a host such as a personal computer as monochrome image data. In the monochrome reading mode, as shown in FIG. 8, image data via the G (green) filter, which has the highest electrical signal output from a sensor among R (red) 803, G (green) 801, and B (blue) 802, is adopted and converted to a monochrome image. FIG. 8 shows the output signals that are output from RGB line sensors. In FIG. 8, the horizontal axis indicates the number of pixels in a main scanning direction, and the vertical axis indicates the line sensor output signal. Reference numerals 801 to 803 respectively indicate the output of a G (green) sensor, the output of a B (blue) sensor, and the output of an R (red) sensor. The image data with the highest electrical signal output is adopted because this is advantageous for the S/N ratio of the image, and as a result a high quality image is obtained.

In this way, in many MFPs, the same sensors are often adopted for the color mode in which a color original is read as a color image and the monochrome mode in which a color original is read as a monochrome image. On the other hand, when reading a monochrome image, although high image quality with smooth tonality is also sought, often there are greater demands for high productivity.

Consequently, in Japanese Patent Laid-Open No. 2001-144900, technology is proposed relating to a 4-line line sensor in which a color image is read with an RGB 3-line color sensor, and a monochrome line sensor having higher productivity is also provided. Japanese Patent Laid-Open No. 2001-144900 describes a control method for reading a color image with the RGB 3-line sensor, and reading a monochrome image with the 1-line sensor for the monochrome mode. Also, Japanese Patent Laid-Open No. 2003-274115 proposes a method for, when the horizontal transfer speed of the monochrome line sensor is made faster than that of the color line sensor, avoiding the introduction of noise from the monochrome line sensor, which has a higher horizontal transfer speed, into the color line sensor.

Figure 9:
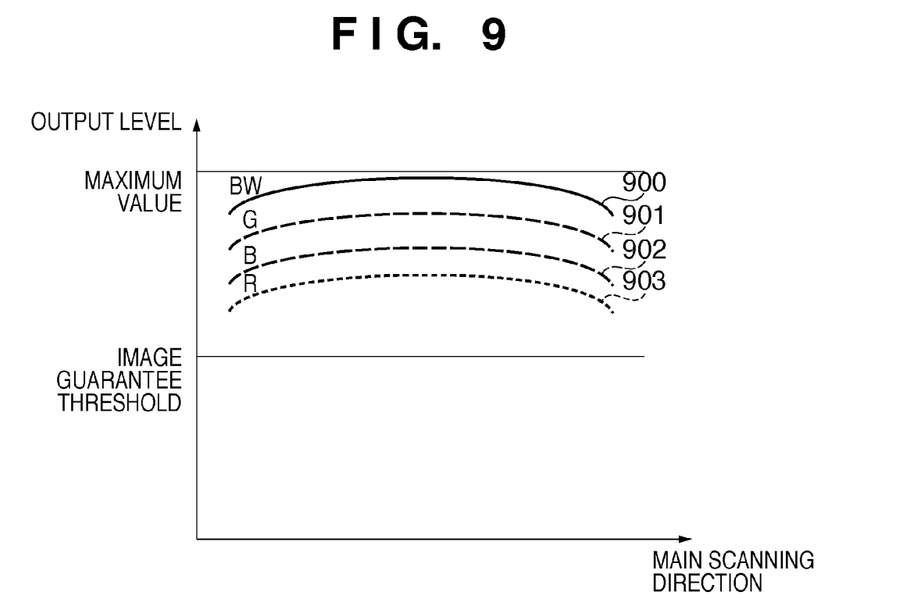
FIG. 9 shows output signals that are output from an RGB line sensor and a monochrome line sensor.

However, there are the problems described below in the above conventional technology. First, the color line sensor and the monochrome line sensor will be described in detail. Light is illuminated on the RGB 3-line sensor for color reading via each of the R filter, the G filter, and the B filter. Accordingly, if the light amount and the horizontal transfer speed are the same, the output level from the line sensor is higher for the monochrome sensor, which does not employ a filter. FIG. 9 shows the output signals that are output from the RGB line sensors and the monochrome line sensor. In FIG. 9, the horizontal axis indicates the number of pixels in the main scanning direction, and the vertical axis indicates the line sensor output signal. Reference numerals 900 to 903 respectively indicate the output of a BW (monochrome) sensor, the output of a G (green) sensor, the output of a B (blue) sensor, and the output of an R (red) sensor. As shown in FIG. 9, the relationship of the output levels is BW 900>G 901>B 902>R 903.

Figure 10:
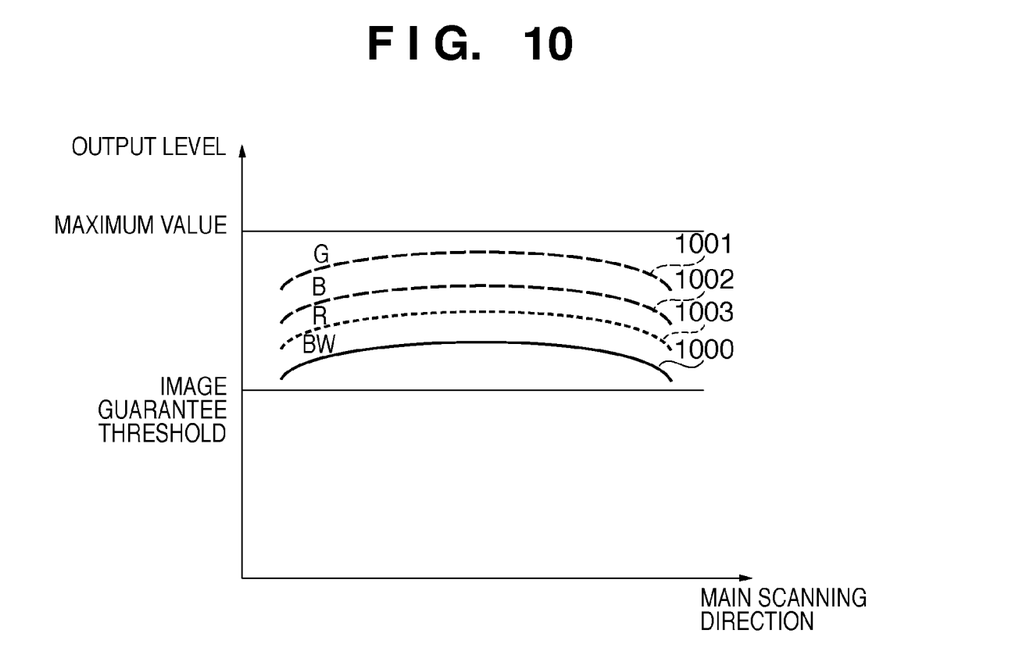
FIG. 10 shows output signals that are output from an RGB line sensor and a monochrome line sensor.

Accordingly, even assuming that the horizontal transfer speed of the monochrome line sensor without a filter has been made faster than the horizontal transfer speed of the color 3-line sensor, the output level from each sensor when reading a white reference plate satisfies image tonality. FIG. 10 shows the output signals that are output from the RGB line sensors and the monochrome line sensor. In FIG. 10, the horizontal axis indicates the number of pixels in the main scanning direction, and the vertical axis indicates the line sensor output signal. Reference numerals 1000 to 1003 respectively indicate the output of a BW (monochrome) sensor, the output of a G (green) sensor, the output of a B (blue) sensor, and the output of an R (red) sensor. Unlike FIG. 9, FIG. 10 shows the result of making the horizontal transfer speed of the monochrome line sensor faster than that of the RGB line sensor. This will be described with reference to FIG. 11.

Figure 11:
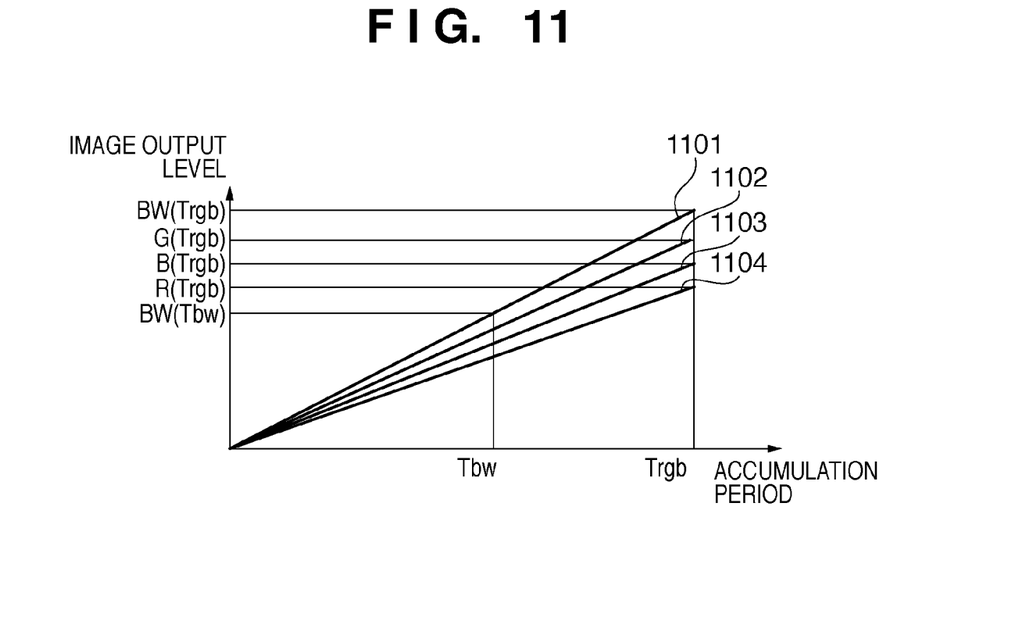
FIG. 11 shows the relationship between a light amount accumulation period and an output level per pixel for an RGB line sensor and a monochrome line sensor.

FIG. 11 shows the relationship between a light amount accumulation period and the output level per pixel for the RGB line sensors and the monochrome line sensor. The horizontal axis indicates the light amount accumulation period for each line sensor, and the vertical axis indicates the output level per pixel for each line sensor. Reference numeral 1101 indicates an output curve for the monochrome line sensor, reference numeral 1102 indicates an output curve for the G line sensor, reference numeral 1103 indicates an output curve for the B line sensor, and reference numeral 1104 indicates an output curve for the R line sensor.

The period indicated by Trgb is the period of accumulation in 1 pixel at the horizontal transfer speed of the color (RGB) line sensors, and the output level relationship in this case is the relationship shown in FIG. 9. However, when the horizontal transfer speed of the monochrome line sensor is made faster than that of the color line sensors in order to increase productivity, the accumulation period becomes the period indicated by Tbw. The output level in this case is indicated by BW (Tbw), and the relationship of this output level with G (Trgb), B (Trgb), and R (Trgb), which are the output levels in the accumulation period Trgb of the color line sensors, is the output level relationship as shown in FIG. 10, indicated for one line in the main scanning direction.

That is, as shown in FIGS. 9 to 11, in order to obtain a predetermined image output level, it is possible to make the horizontal transfer speed faster for reading with a monochrome line sensor than for reading with a color 3-line sensor. The time needed for consecutively reading a plurality of pages can be less in the case of original image reading in the monochrome mode employing the monochrome line sensor than when reading with the color 3-line sensor in the color mode, and so it is possible to increase productivity.

However, when the scanner is driven for a long time, the lamp progressively deteriorates. When deterioration progresses due to such driving for a long time and the light amount of the lamp decreases, in the monochrome mode employing the monochrome line sensor with a transfer clock set to a high speed, the problem occurs that the light amount is insufficient, and so image quality decreases.

In such a case, the output level from the monochrome line sensor can be ensured by setting a slower monochrome horizontal transfer clock so as to be the same as the color horizontal transfer clock, as shown in FIG. 11. However, in a state in which the light amount has decreased, it is necessary to perform readjustment that takes a long time, such as gain adjustment that amplifies the output of the line sensor or offset adjustment for determining the black level. In other words, because an adjustment operation is necessary, if in the midst of a job, it is necessary to secure time between originals and thus decrease productivity, and if prior to starting a job, it is necessary to delay a first scan in which the first page of an original is read.

SUMMARY OF THE INVENTION

The present invention enables realization of an image reading apparatus that, when the amount of light illuminated from an image reading lamp has decreased, maintains the quality of a read image without decreasing productivity.

One aspect of the present invention provides an image reading apparatus, comprising: an illumination unit that illuminates a reading position; a color reading unit that receives reflected light from an original at the reading position to read a color image in a color mode; a monochrome reading unit that receives reflected light from an original at the reading position to read a monochrome image in a monochrome mode; and a reading control unit that performs original image reading processing using the color reading unit when a reading mode of reading an original is the monochrome mode and a light amount of the illumination is less than a threshold.

Further features of the present invention will become apparent from the following description of an exemplary embodiment (with reference to the attached drawings).

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
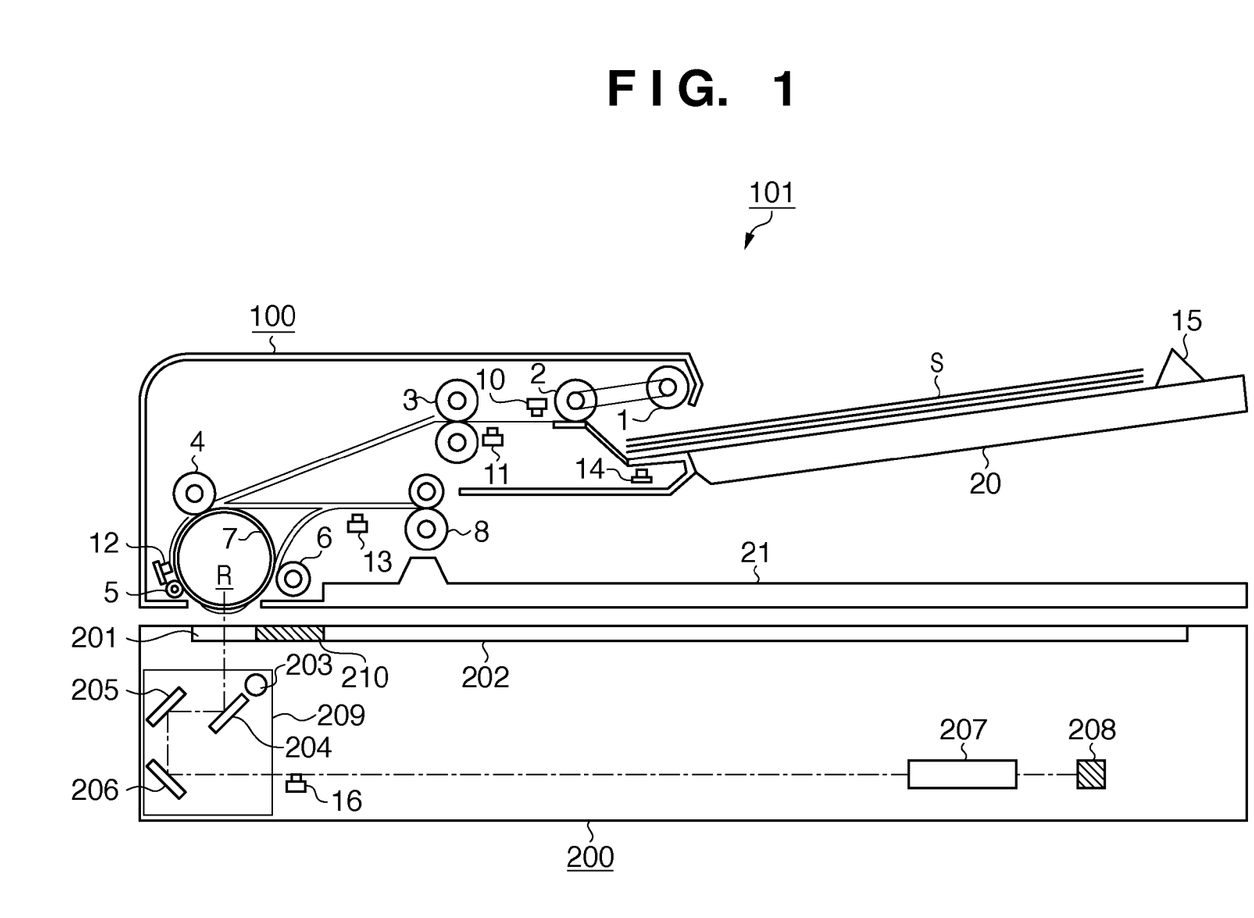
FIG. 1 is a cross-sectional view that shows an example configuration of an image reading apparatus 101 according to the present embodiment.

Below is a description of an embodiment of the present invention with reference to FIGS. 1 to 7. FIG. 1 is a cross-sectional view that shows an example configuration of an image reading apparatus according to the present embodiment. In order to perform image reading processing that reads an image from an original, this image reading apparatus 101 shown in FIG. 1 is provided with an ADF (Automatic Document Feeder) 100, which is an original conveying apparatus, and a reader unit 200. In the ADF 100, from an original batch S that has been placed on an original tray 20 with its front side facing upward, a topmost original is fed out to a separation unit 2 by a pickup roller 1. In the separation unit 2, a separation roller is disposed above and a separation pad is disposed below, and pages of the original batch S are separated one-by-one starting from the topmost page.

When reading an image of the front side of a one-sided original, skew correction of the separated original during separated conveyance is performed by a first registration roller 3. Thereafter, the original is conveyed from the first registration roller 3 to a second registration roller 4, and a first conveying roller 5. Here, an image of the front side is read at a reading position R. Then, the original is discharged in sequence by a discharge roller 8 from a second conveying roller 6 onto a discharge tray 21 with the front side of the original facing downward.

When reading an image of both the front and back sides of a duplex original, skew correction of the separated original during separated conveyance is performed by the first registration roller 3. Thereafter, the original is conveyed from the second registration roller 4 to the first conveying roller 5 and the second conveying roller 6. Here, an image of the front side is read at the reading position R. Then, the leading edge of the original is conveyed from the second conveying roller onto the discharge tray 21 by the discharge roller 8, and conveyance is temporarily stopped in a state in which the trailing edge in reading has been nipped by the discharge roller 8.

Then, switchback conveyance of the original is performed, and after skew correction has again been performed by the second registration roller 4, the original is conveyed by the first conveying roller 5 and the second conveying roller 6, and an image of the back side is read while the original is again conveyed through the reading position R.

When, in this state, the original is discharged by the discharge roller 8 from the second conveying roller 6 onto the discharge tray 21 with the front side of the original facing upward, the side sequence of the original on the discharge tray 21 differs from the side sequence in which the original was placed on the original tray 20. Therefore, the leading edge of the original whose back side has been read is again conveyed onto the discharge tray 21 by the second conveying roller 6 and the discharge roller 8, and conveyance is stopped in a state in which the trailing edge in reading has been nipped by the discharge roller 8.

Then, switchback conveyance is again performed, and after conveyance by the second registration roller 4, the first conveying roller 5, and the second conveying roller 6, the original is discharged onto the discharge tray 21 in sequence by the discharge roller 8 with the front side of the original facing downward. However, reading of an original image is not performed while the original is being conveyed through the reading position R.

The reader unit 200 optically reads image information that has been recorded to the original, photo-electrically converts the read image information, and inputs the converted image information as image data. The reader unit 200 is provided with an ADF platen 201, a book platen 202, a scanner unit 209 having a lamp 203 and a mirror 204, mirrors 205 and 206, a lens 207, and a line sensor 208. A white reference plate 210 used as a reference is disposed between the ADF platen 201 and the book platen 202. This white reference plate 210 is used when reading the reflected light of the white reference plate 210 via the scanner unit 209 with the line sensor 208 to perform light amount sampling, shading correction, or the like.

When reading an image of an original conveyed from the ADF 100, the reader unit 200 moves the scanner unit 209 under the ADF platen 201 and stops the scanner unit 209 there, and reads image information while the original is being transported over the reading position R. When reading an image of an original that has been placed on the book platen 202, the reader unit 200 moves the scanner unit 209 in the sub scanning direction from an unshown original placement reference to read image information.

When reading image information, the lamp 203 is lit to illuminate the original. Reflected light from the original is input to the line sensor 208 via the mirrors 204, 205, and 206 and the lens 207. Here, electrical processing such as photo-electrical conversion and ordinary digital conversion are performed on the reflected light from the original that has been input to the line sensor 208.

Here, a reading apparatus is described in which the reader unit 200 and the ADF 100 are integrated in a single body, but the present invention can also be realized with the ADF 100 being an unconnected stand-alone apparatus of the reader unit 200.

Figure 2:
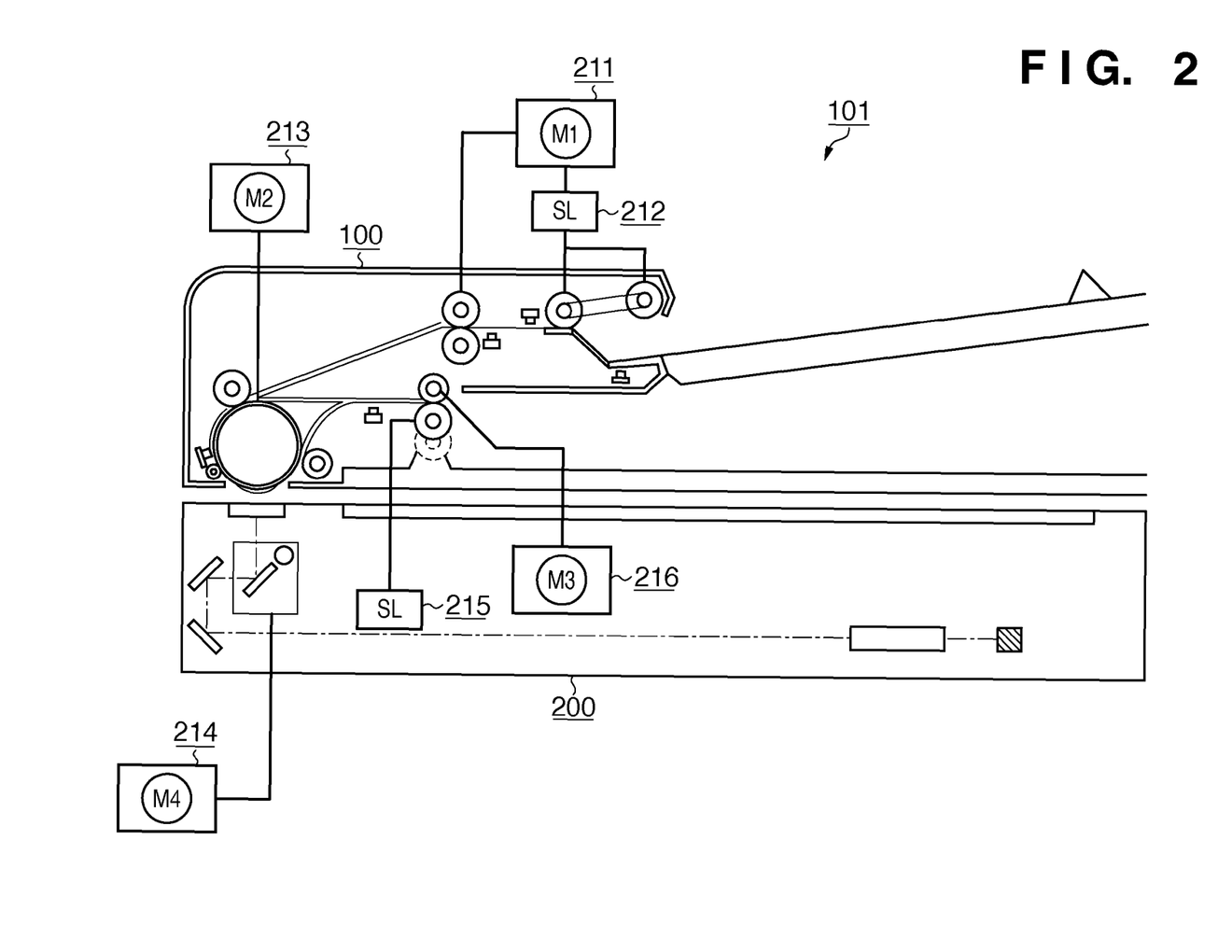
FIG. 2 shows a driving control of an ADF 100 and a reader unit 200 according to the present embodiment.

Next is a description of the driving configuration of the image reading apparatus 101, with reference to FIG. 2. FIG. 2 shows a driving control of the ADF 100 and the reader unit 200 according to the present embodiment.

Reference numeral 211 indicates a separation motor M1 for separating and conveying pages of an original batch one-by-one. Reference numeral 212 indicates a supply clutch CL that controls whether or not to transmit driving of the separation motor M1 to the pickup roller 1. Reference numeral 213 indicates a supply motor M2 that supplies a separated original to the reading position R. Reference numeral 216 indicates a discharge motor M3 for driving the discharge roller 8 for discharging an original. Reference numeral 215 indicates a separation solenoid SL that controls separation of the discharge roller 8 when originals pass by each other in duplex reading. Reference numeral 214 indicates an optical motor M4 for driving the scanner unit 209 disposed in the reader unit 200.

Figure 3:
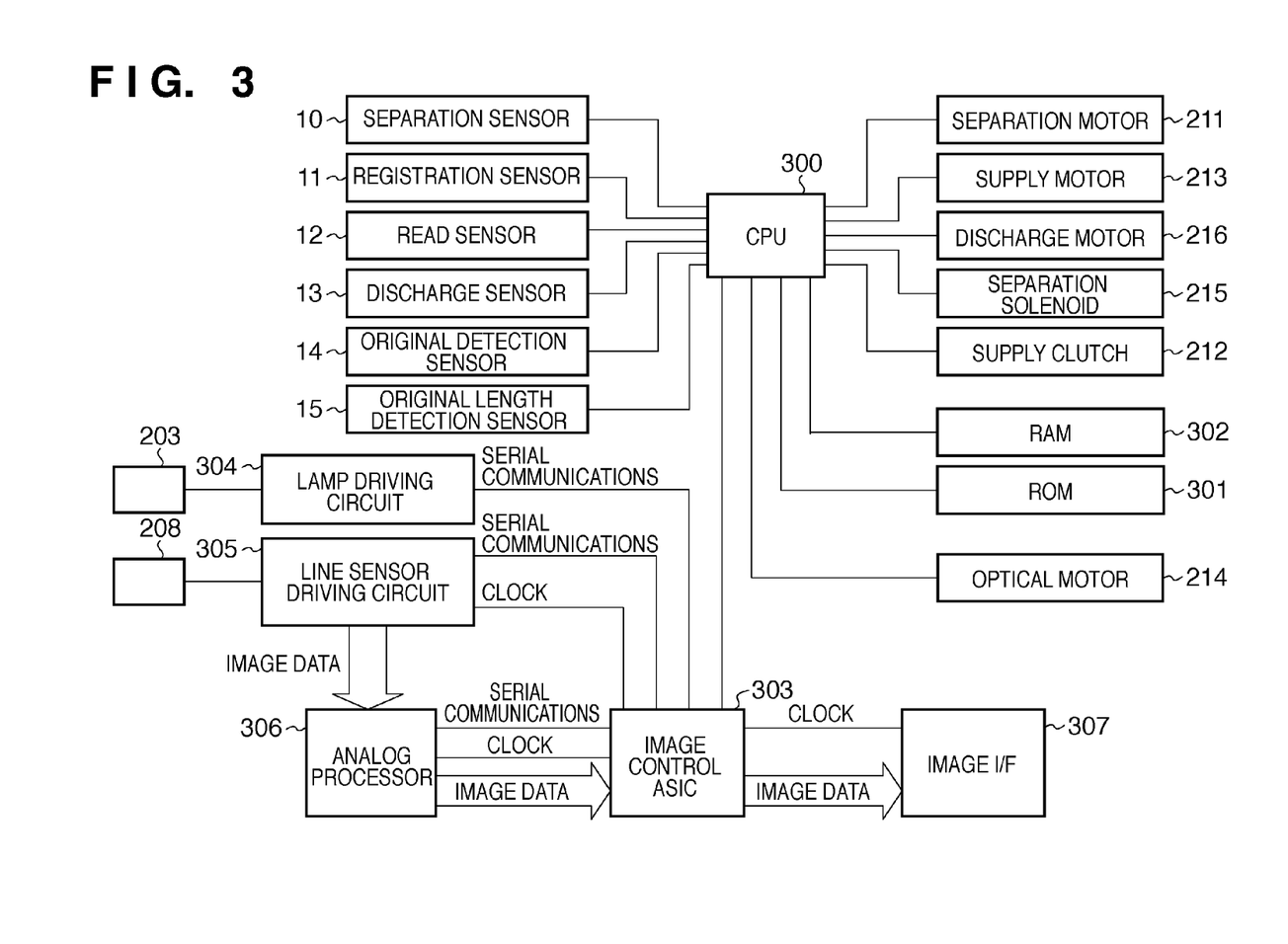
FIG. 3 shows a control configuration for performing unified control of the ADF 100 and the reader unit 200 according to the present embodiment.

Next is a description of the control configuration of the image reading apparatus 101, with reference to FIG. 3. FIG. 3 shows a control configuration for performing unified control of the ADF 100 and the reader unit 200 according to the present embodiment.

The image reading apparatus 101 is provided with a CPU 300, which is a central computation/processing apparatus, a read-only memory (below, ROM) 301, a random access memory (below, RAM) 302, an output port, and an input port. A control program is stored in the ROM 301, and input data and work data are stored in the RAM 302. The separation motor M1, the supply motor M2, the discharge motor M3, the optical motor M4, the separation solenoid SL, and the supply clutch CL are connected to the output port. On the other hand, a separation sensor 10, a registration sensor 11, a read sensor 12, a discharge sensor 13, an original detection sensor 14, an original length detection sensor 15, and a home position sensor 16 shown in FIG. 1 are respectively connected to the input port.

The CPU 300 operates the ADF 100 by controlling the separation motor M1, the supply motor M2, the discharge motor M3, the separation solenoid SL, and the supply clutch CL according to the control program stored in the ROM 301, which is connected via a bus. In order to also operate the scanner unit of the reader unit 200, the CPU 300 determines a position with the home position sensor 16, and then controls the optical motor M4 to a predetermined position.

Also, the CPU 300 is connected to an image control ASIC 303 via a bus. This image control ASIC 303 is connected to a lamp driving circuit 304, a line sensor driving circuit 305, and an analog processor 306. The lamp driving circuit 304 lights or extinguishes the lamp 203 that illuminates an original. The line sensor driving circuit 305 drives the line sensor 208, which uses the mirror 204 to read reflected light of an original that has been illuminated due to the lamp 203 being lit. The analog processor 306 performs electrical offset correction or amplification correction of the output value of image data from the line sensor 208.

According to the present embodiment, the CPU 300 controls the lamp driving circuit 304, the line sensor driving circuit 305, and the analog processor 306 via the image control ASIC 303. According to another embodiment, the CPU 300 may directly control the driving circuits (304 to 306).

Figure 4A:
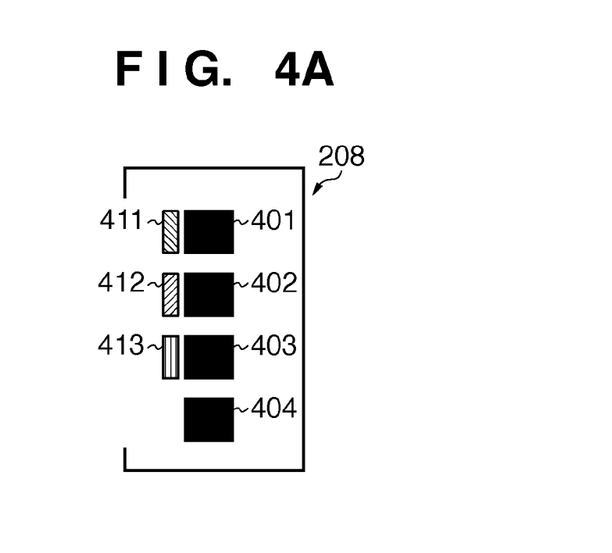
FIG. 4A shows an example configuration of a line sensor 208 according to the present embodiment.
Figure 4B:
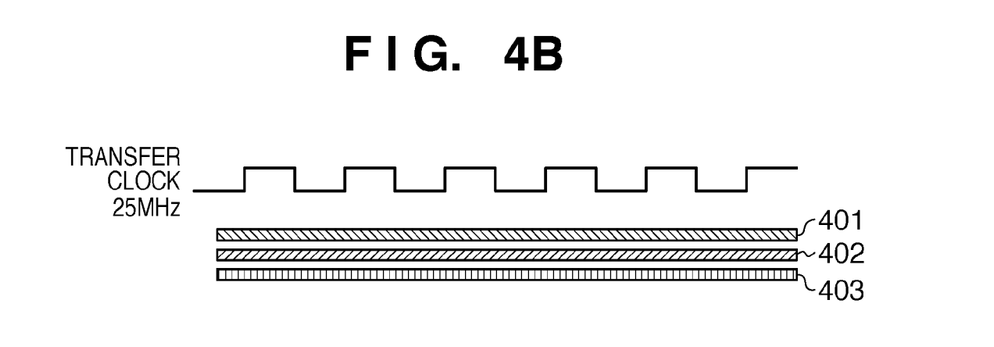
FIG. 4B shows a color image transfer method according to the present embodiment.
Figure 4C:
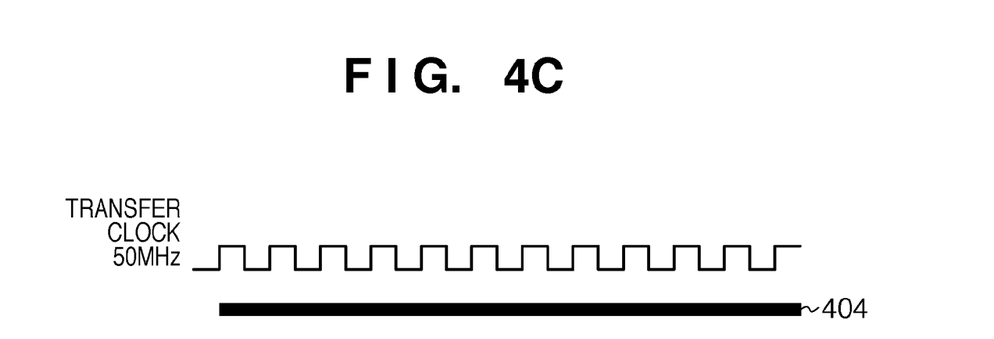
FIG. 4C shows a monochrome image transfer method according to the present embodiment.

Next is a description of clock switching of the line sensor 208, with reference to FIGS. 4A to 4C. FIG. 4A is a side view of the line sensor 208 according to the present embodiment.

The line sensor 208 is provided with four line sensors 401, 402, 403, and 404. Among those, the R line sensor 401 receives light via a red filter (below, R filter) 411, and outputs data of a red image in three primary colors. The G line sensor 402 receives light via a green filter (below, G filter) 412, and outputs data of a green image in three primary colors. The B line sensor 403 receives light via a blue filter (below, B filter) 413, and outputs data of a blue image in three primary colors. The monochrome line sensor 404 receives reflected light of an original directly, not via a filter, and therefore outputs monochrome image data. In this embodiment, the line sensor 208 that is adopted can thus handle two types of image: a 3-line color image via the R/G/B filters, and a monochrome image that is not obtained via a filter. Accordingly, the RGB lines sensors 401 to 403 correspond to a color reading unit provided with a plurality of line sensors corresponding to respective color components, and the monochrome line sensor 404 corresponds to a monochrome reading unit.

FIG. 4B shows a color image transfer method according to the present embodiment. FIG. 4C shows a monochrome image transfer method according to the present embodiment.

Ordinarily, in the case of a line sensor, line sensor image data is transferred according to a transfer clock. In the present embodiment, a 25 MHz transfer clock is supplied to the RGB line sensors 401 to 403, and a 50 MHz transfer clock is supplied to the monochrome line sensor 404. In other words, the image signal transfer frequency of the monochrome line sensor 404 is faster than the image signal transfer frequency of the RGB line sensors 401 to 403. The reason for adopting different image signal transfer frequencies for color and monochrome is as follows. The line sensors 401 to 403 that read a color image receive light via the respective R/G/B filters 411 to 413, the reflected light of the original becomes slightly darker. Consequently, in order to obtain image data having high image quality, the necessary amount of received light is ensured by using a transfer clock that is slower than that of the monochrome line sensor 404. Although not described in detail, the brightest of these three lines is the G line sensor 402, which obtains a green image via the G filter.

On the other hand, the monochrome line sensor 404 that outputs a monochrome image does not receive light via a filter. Therefore, the output level of the monochrome line sensor 404 is high, unlike the line sensors 401 to 403 that receive light via the respective R/G/B filters 411 to 413. Accordingly, sufficient image quality can be obtained for a monochrome image that is output from the monochrome line sensor 404, even if the transfer clock is faster than the transfer clock for a color image.

In the present embodiment, as one example, image transfer is performed at a frequency of 50 MHz for a monochrome image, which is double the 25 MHz frequency used for a color image. However, these numerical values are an example, and not a limitation. That is, any sort of frequency may be used as long as the frequency is faster for a monochrome image than for a color image.

Figure 5:
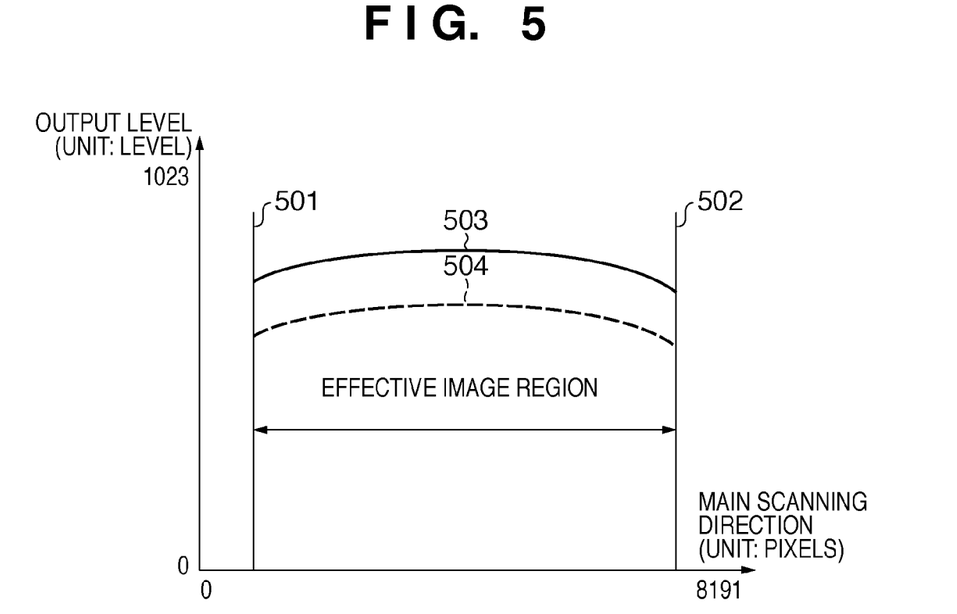
FIG. 5 shows the output level of a G line sensor 402 and a monochrome line sensor 404 according to the present embodiment.

FIG. 5 shows an output level 503 of the G line sensor 402 and an output level 504 of the monochrome line sensor 404 according to the present embodiment. The resulting output levels shown in FIG. 5 are the result of measurement using the transfer clock in FIGS. 4B and 4C.

As described with reference to FIG. 11, if the same transfer clock is used, a monochrome image is brighter than a green image to the extent that light is not received via a filter, but because a faster transfer clock is used for a monochrome image, the amount of received light is less, and so a monochrome image has a lower output level than a green image.

Figure 6:
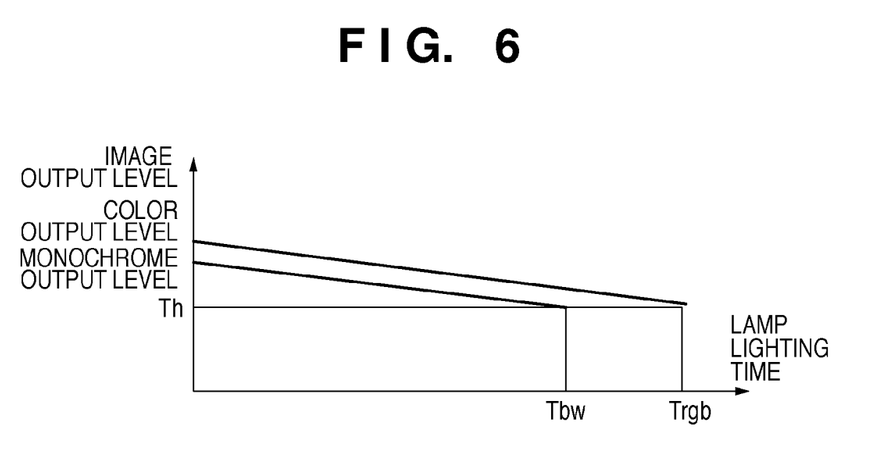
FIG. 6 shows the relationship between lamp driving time and deterioration of the amount of light received by each line sensor according to the present embodiment.

FIG. 6 shows the relationship between lamp driving time and deterioration of the amount of light received by each line sensor according to the present embodiment. In FIG. 6, the horizontal axis shows the lamp lighting time, and the vertical axis shows the image output level of each line sensor.

As shown in FIG. 6, as the lamp lighting time increases, the output level of the respective line sensors decreases. Th indicates a threshold of the image output level that will satisfy image quality. When the output level is less than the threshold Th, high image quality tonality cannot be maintained.

The time when the output level drops below the threshold Th in the monochrome mode is Tbw, and the time when the output level drops below the threshold Th in the color mode is Trgb. Here, monochrome mode indicates a reading mode in which a monochrome image is read, and color mode indicates a reading mode in which a color image is read. In the color mode, because the horizontal transfer speed is slower although an image is obtained by receiving light via the respective RGB filters, the time when the output level drops below the threshold Th, relative to a monochrome line whose horizontal transfer speed is fast, is: Tbw<Trgb. Also, it is understood that when Trgb is passed in FIG. 6, the useful life of the lamp has been reached.

When the light amount of the lamp decreases due to deterioration in this way, first the output level of the monochrome line sensor 404 used in the monochrome mode drops below the threshold Th, and afterward the output level of the RGB line sensors 401 to 403 used in the color mode drops below the threshold Th. Consequently, in the present embodiment, in order to extend the useful life of the lamp, when the output level of the monochrome line sensor 404 drops below the threshold Th, image reading is performed using any of the RGB line sensors 401 to 403. Thus, in the image reading apparatus according to the present embodiment, it is not necessary to provide an adjustment time required in order to slow the horizontal transfer speed of the monochrome line sensor. Accordingly, it is possible to extend the useful life of the lamp without decreasing the productivity of the image reading apparatus.

Figure 7:
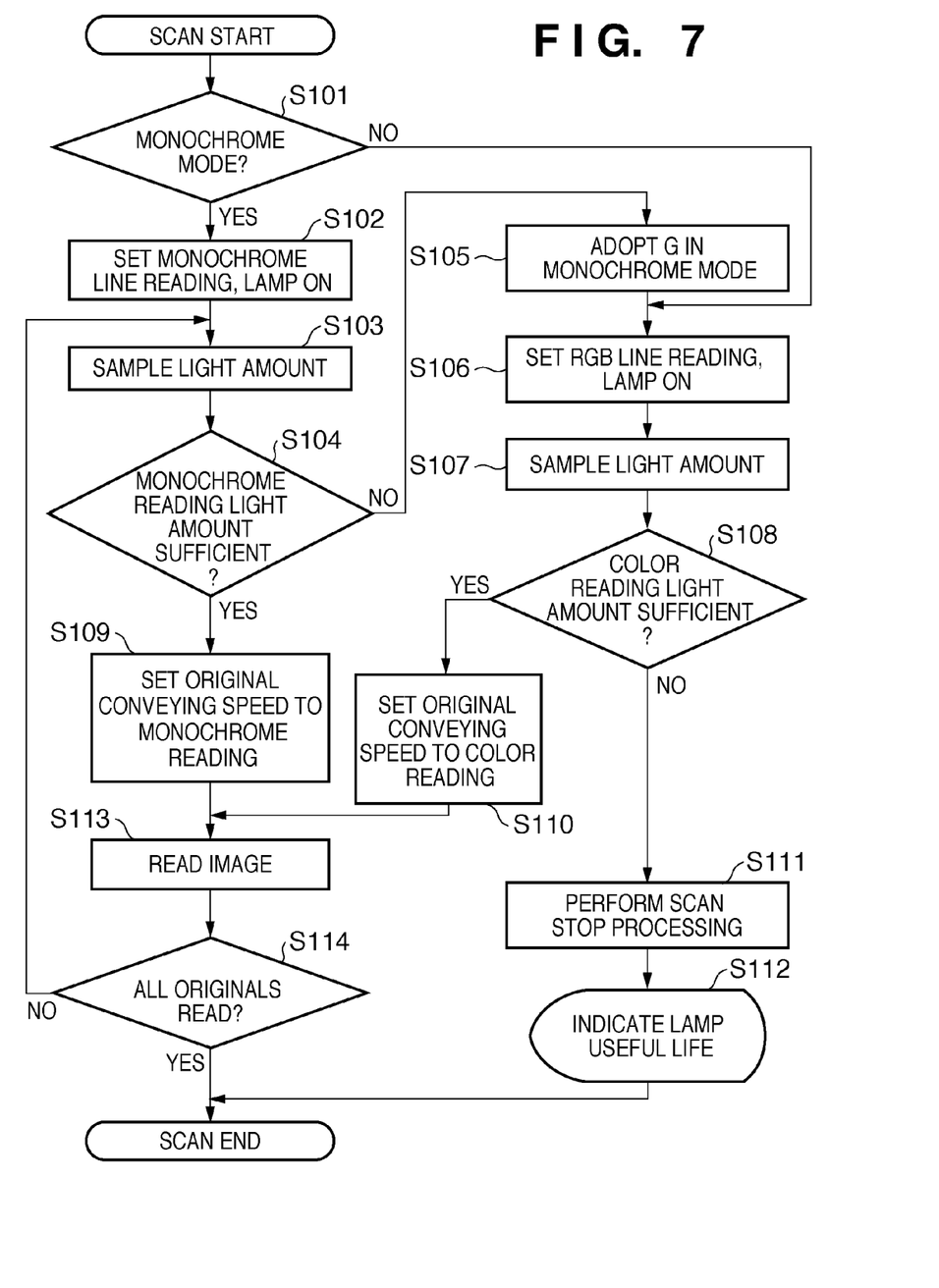
FIG. 7 is a flowchart that shows a control procedure the switches the line sensor according to the present embodiment.

Next is a description of a switching control of the respective line sensors 401 to 404 according to the present embodiment, with reference to FIG. 7. FIG. 7 is a flowchart that shows a control procedure for switching line sensors according to the present embodiment. Here, a flow for switching to an image of the G line sensor 402 when the lamp light amount has decreased for a monochrome image from the monochrome line sensor in the monochrome mode will be described. The overall control of the processing described below is performed by the CPU 300.

First, an original batch that has been placed on the original tray 20 of the ADF 100 is supplied/conveyed under the ADF platen 201 of the reader unit 200, and image reading processing (a scan job) is started. Here, the ADF 100 separates and conveys the original batch page-by-page. Such a scan job is started when a start key in an operation unit of the image reading apparatus 101 is pressed.

When the scan job is started, in Step S101, the CPU 300, functioning as a mode determination unit, determines whether or not the reading mode that has been set in the operation unit is the monochrome mode. When not set to the monochrome mode, processing proceeds to Step S106, and when set to the monochrome mode, processing proceeds to Step S102.

In Step S106, the CPU 300 performs color reading settings for performing color reading for the RGB line sensors 401 to 403 in the image control ASIC 303. Further, the CPU 300 sets a color reading lamp light amount in the lamp driving circuit 304, and causes the lamp 203 to emit light. Further, the CPU 300 sets color reading gain and offset values for the analog processor 306.

Although not described in detail, the lamp light amounts, gain values, and offset values set at this time are determined via an adjustment control that is performed after a power source is turned on to the circuit shown in FIG. 3, and controls the ADF 100 and the reader unit 200. This adjustment control drives the respective loads (such as the lamp 203 and the line sensor 208) of the ADF 100 and the reader unit 200, and is performed for the lamp driving circuit 304, the line sensor driving circuit 305, and the analog processor 306 in the respective reading modes. Further, this adjustment control is performed with reference to the image RAM of the image control ASIC 303 in which output from the line sensors is stored.

Next, in Step S107, the CPU 300, functioning as a sampling unit, drives the optical motor M4 to move the scanner unit 209 and performs light amount sampling. First, the mirror 204 is moved to the position of the white reference plate 210 between the ADF platen 201 and the book platen 202. Then, the output values from the RGB line sensors 401 to 403 in the line sensor 208 are respectively read by the image control ASIC 303. The sampling referred to here is sampling of the output level from the RGB line sensors 401 to 403.

Next, in Step S108, the CPU 300, functioning as a light amount determination unit, determines whether or not the light amount satisfies the threshold Th shown in FIG. 6. When the light amount satisfies the threshold Th, processing proceeds to Step S110, and when the light amount does not satisfy the threshold Th, processing proceeds to Step S111.

When the light amount does not satisfy the threshold Th, in Step S111, the CPU 300, functioning as a reading control unit, performs scan stop processing, and discharges the original that is being conveyed to the discharge tray 21. Further, the CPU 300 drives the optical motor M4 to move the scanner unit 209 to a position where the scanner unit 209 is detected by the home position sensor 16, and then establishes a standby state. Thereafter, in Step S112, the CPU 300 indicates to the operation unit that the lamp has reached its useful life, and ends processing.

On the other hand, when the light amount satisfies the threshold Th, in Step S110, the CPU 300 sets the original conveying speed to a speed coordinated with the transfer frequency of the image signals of the RGB line sensors 401 to 403. This original conveying speed when reading an original with the RGB line sensors 401 to 403 is slower than the original conveying speed when reading an original with the monochrome line sensor 404. At the same time, control is performed to drive the optical motor M4 such that the mirror 204 of the scanner unit 209 is directly below the reading position R. Thereafter, pages of the original batch on the original tray 20 are separated one-by-one, and at the original conveying speed set in S110, the leading edge of the conveyed original arrives at the reading position R. When the original arrives at the reading position R, in Step S113, the CPU 300 transfers the signals output from the RGB line sensors 401 to 403 to the image control ASIC 303, via the analog processor 306 for each single line R, G, and B. Here, the horizontal transfer clock of the RGB line sensors 401 to 403 is 25 MHz, as shown in FIG. 4B. Thus, the length of one original page is read, and processing proceeds to S114.

When determined in Step S101 that the reading mode is the monochrome mode, in Step S102, the CPU 300 performs monochrome line reading settings, and then causes the lamp 203 to emit light. Here, the CPU 300 sets the monochrome reading lamp light amount in the lamp driving circuit 304, and causes the lamp to emit light. Also, the CPU 300 sets monochrome reading gain and offset values for the analog processor 306.

Next, in Step S103, the CPU 300 drives the optical motor M4 to move the scanner unit 209 and sample the light amount. At this time, the mirror 204 is moved to the position of the white reference plate 210 between the ADF platen 201 and the book platen 202. Further, the CPU 300 reads the output value from the monochrome line sensor 404 in the line sensor 208 with the image control ASIC 303.

When sampling the light amount, in Step S104, the CPU 300 determines whether or not the output level from the monochrome line sensor 404 has surpassed the threshold Th shown in FIG. 6, and determines whether or not the light amount satisfies the threshold Th. Here, when the light amount satisfies the threshold Th, processing proceeds to Step S109, and when the light amount does not satisfy the threshold Th, processing proceeds to Step S105.

When the light amount satisfies the threshold Th, in Step S109, the CPU 300, functioning as a reading control unit, sets the original conveying speed to a speed coordinated with the transfer frequency of the image signal of the monochrome line sensor 404. This original conveying speed when reading an original with the monochrome line sensor 404 is faster than the original conveying speed when reading an original with the RGB line sensors 401 to 403, and so original reading productivity is higher. At the same time, control is performed to drive the optical motor M4 such that the mirror 204 of the scanner unit 209 is directly below the reading position R. Thereafter, pages of the original batch on the original tray 20 are separated one-by-one, and the leading edge of the conveyed original arrives at the reading position R.

Next, in Step S113, the CPU 300 transfers the signal output from the monochrome line sensor 404 to the image control ASIC 303, via the analog processor 306 for each single monochrome line. Here, the horizontal transfer clock of the monochrome line sensor 404 is 50 MHz, as shown in FIG. 4C. Thus, the length of one original page is read, and processing proceeds to S114.

In Step S114, the CPU 300 determines whether or not after image reading of one original page, there is an original that has not been read in the conveyance path within the ADF 100, and determines whether or not there is an original on the original tray 20. If there is an original that has not yet been read, processing returns to Step S103, and light amount sampling of the presently set reading mode is performed. On the other hand, when all originals have been read, processing is ended.

On the other hand, when the output level from the monochrome line sensor 404 is below the threshold Th and the light amount is determined to be insufficient in Step S104, processing proceeds to S105. In S105, although in the monochrome mode, the CPU 300 performs settings in the image control ASIC 303 to perform image reading using the output value from the G line sensor 402, which has the highest light amount among the RGB line sensors 401 to 403.

Next, in Step S106, the CPU 300 sets G line sensor gain and offset values in the analog processor 306. Here, the same gain and offset values for the R line sensor 401 and the B line sensor 403 as for ordinary color reading may be also set in the analog processor 306. This is because in the present embodiment, in Step S105 settings are performed in the image control ASIC 303 so as to adopt only output image data from the G line sensor 402. By setting only output image data from the G line sensor 402, it is possible to shorten the time for performing settings in the analog processor 306, so performance can be optimized.

Next, in Step S107, the CPU 300, in order to perform light amount sampling in the case of setting the RGB line sensors 401 to 403, again performs control to drive the optical motor M4 to move the mirror 204 of the scanner unit 209 to the position of the white reference plate 210. Here, the CPU 300 performs stop control such that the leading edge of an original that has been separated from on the original tray 20 and conveyed is positioned prior to the reading position R.

Furthermore, in Steps S107 and S108, same as in the color mode, the CPU 300 samples the light amount, and determines whether or not the color reading light amount satisfies the threshold Th. If the reading light amount has been reached, processing proceeds to S110, and the CPU 300, functioning as a reading control unit, sets an original conveying speed for color reading. Accordingly, in Step S113, the color mode conveying speed is used, but an image is read in the monochrome mode using a color line sensor. On the other hand, if the reading light amount is not sufficient, same is in the color mode, in Steps S111 and S112, the CPU 300 stops scan processing, indicates lamp useful life, and ends processing.

As described above, the image reading apparatus according to this embodiment is provided with RGB line sensors that read a color image and a monochrome line sensor that reads a monochrome image and has a faster horizontal transfer speed than the RGB line sensors. Further, this image reading apparatus reads a monochrome image using the RGB line sensors even in the monochrome mode in a case where the light amount of a lamp for illuminating an original decreases and so an output level for reading an image with good quality cannot be obtained from a monochrome line sensor. In this case, this image reading apparatus performs image reading processing using the G line sensor, which has the highest output level at the same light amount among the RGB line sensors. In this way, even when the light amount of the lamp has decreased, this image reading apparatus, by switching the line sensor that is used, can extend the useful life of the lamp without performing the adjustment processing that is performed in the conventional technology. Thus, this image reading apparatus can maintain the quality of a read image without decreasing productivity, even when the light amount of the lamp has decreased.

The present invention is not limited to the above embodiment, and can be variously modified. For example, this image reading apparatus may switch line sensors when a necessary output level cannot be obtained with the monochrome line sensor, and the necessary output level can be obtained with a color line sensor. On the other hand, the image reading apparatus stops image reading processing when the necessary output level cannot be obtained with a color line sensor. Thus, it is possible to more precisely judge the useful life of the lamp.

Also, this image reading apparatus may perform lamp light amount sampling at least one of prior to performing image reading processing and during performing image reading processing. When sampling is performed during performing image reading processing, it is desirable that sampling is performed while an original is not being conveyed (between originals) at a reading position where the line sensor reads an image. In this way, this image reading apparatus can perform light amount sampling during or before performing image reading processing, and so it is possible to change the time when sampling is performed depending on whether greater importance is placed on productivity or image quality. Also, in this image reading apparatus, rather than a line sensor, a dedicated light amount detection sensor may be provided near the lamp, and lamp light amount sampling performed using the output of the light amount detection sensor.

The present invention is capable of providing an image reading apparatus that, for example, when the amount of light illuminated from an image reading lamp has decreased, maintains the quality of a read image without decreasing productivity, and is also capable of providing a method for controlling that image reading apparatus.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-244944 filed on Sep. 24, 2008, which is hereby incorporated by reference herein in its entirety.

What is claimed is:

1. An image reading apparatus, comprising:
    an illumination unit that illuminates a reading position;
    a color reading unit that includes a plurality of line sensors corresponding to respectively differing color components, the reading unit receiving reflected light from an original on the reading position and outputting a plurality of color component data;
    a monochrome reading unit that receives reflected light from an original on the reading position and outputs monochrome data, wherein an image transfer frequency of the monochrome reading unit is higher than an image transfer frequency of the color reading unit
    a determining unit that determines a mode for reading the original, wherein the mode includes a color mode for reading the original and for outputting the plurality of color component data, and a monochrome mode for reading the original and for outputting the monochrome data; and
    a reading control unit that controls reading of the original in accordance with the mode determined by the determining unit,
    wherein responsive to the color mode, the reading control unit reads the original using the color reading unit and outputs the plurality of color component data,
    wherein responsive to the monochrome mode and a determination that light amount of the illumination unit satisfies a threshold value, the reading control unit reads the original using the monochrome reading unit and outputs the monochrome data, and
    wherein responsive to the monochrome mode and a determination that light amount of the illumination unit does not satisfy the threshold value, the reading control unit reads the original using the color reading unit and outputs the monochrome data.

2. The image reading apparatus according to claim 1, wherein the reading control unit determines whether or not the light amount of the illumination unit satisfies the threshold value based on whether or not a read value of a white reference plate exceeds the threshold value.

3. The image reading apparatus according to claim 1, wherein the reading control unit determines the light amount of the illumination unit based on an output of the color reading unit or the monochrome reading unit.

4. The image reading apparatus according to claim 1, wherein responsive to the color mode and a determination that light amount of the illumination unit satisfies a threshold value, the reading control unit reads the original using the color reading unit and stops the reading of the original responsive to the color mode and a determination that light amount of the illumination unit does not satisfy the threshold value.

5. The image reading apparatus according to claim 1, wherein
    responsive to the monochrome mode and a determination that light amount of the illumination unit does not satisfy the threshold value, the reading control unit reads the original using one of the line sensors in the color reading unit.

6. The image reading apparatus according to claim 5, wherein the plurality of line sensors are line sensors corresponding to red, green, and blue; and
    the reading control unit reads the original using a line sensor corresponding to green.

7. The image reading apparatus according to claim 1, further comprising a conveying unit that moves an original across the reading position, and the color reading unit and the monochrome reading unit read an original image while the conveying unit is conveying the original;
    wherein a conveying speed when using the color reading unit is slower than a conveying speed when using the monochrome reading unit.

8. The image reading apparatus according to claim 1, wherein the reading control unit determines the light amount of the illumination unit before the image reading processing is performed.

9. The image reading apparatus according to claim 8, wherein the reading control unit, while the image reading processing is being performed, determines the light amount of the illumination unit detected between originals.

* * * * *